March 28, 1950     R. C. BARKELEW     2,501,657
FLUID MIXTURE AND VOLUME CONTROL VALVE
Filed Feb. 28, 1948     2 Sheets-Sheet 1
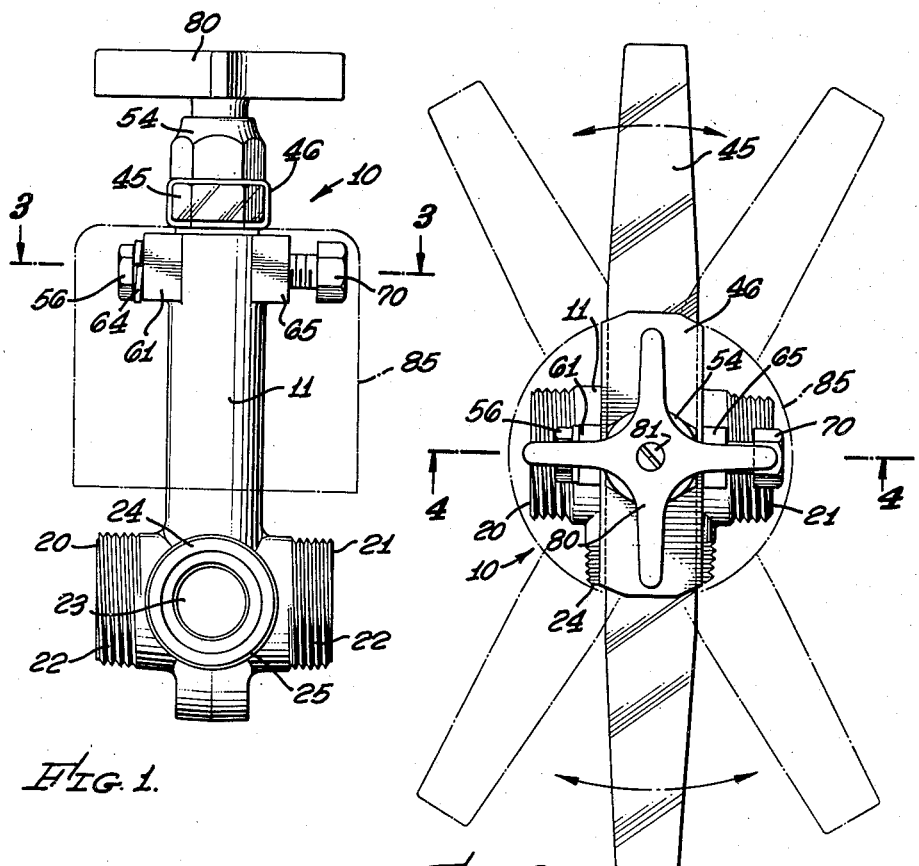
FIG. 1.
FIG. 2.
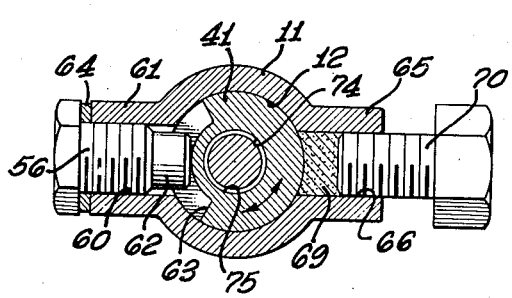
FIG. 3.
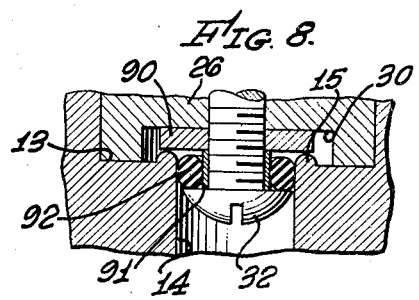
FIG. 8.
RICHARD C. BARKELEW,
INVENTOR.
BY
ATTORNEY March 28, 1950 R. C. BARKELEW 2,501,657
FLUID MIXTURE AND VOLUME CONTROL VALVE
Filed Feb. 28, 1948 2 Sheets-Sheet 2
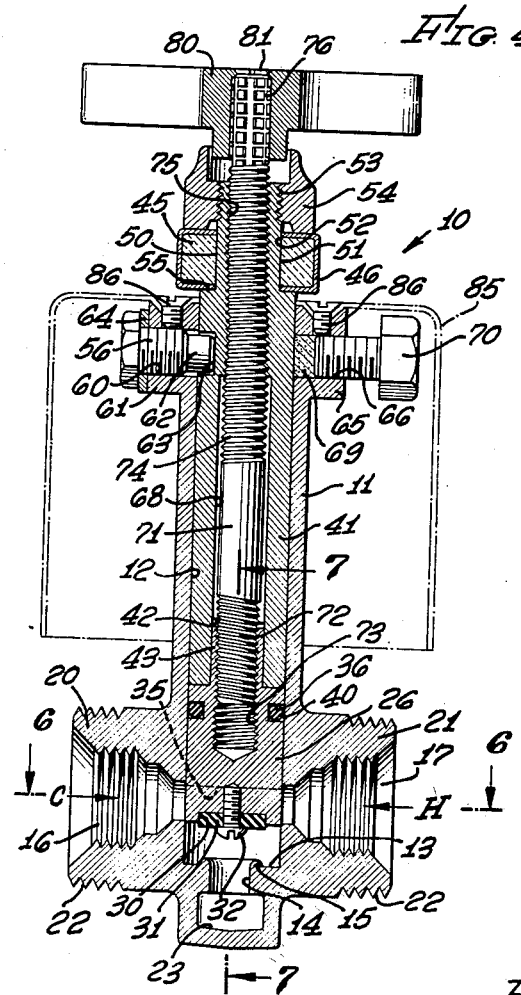
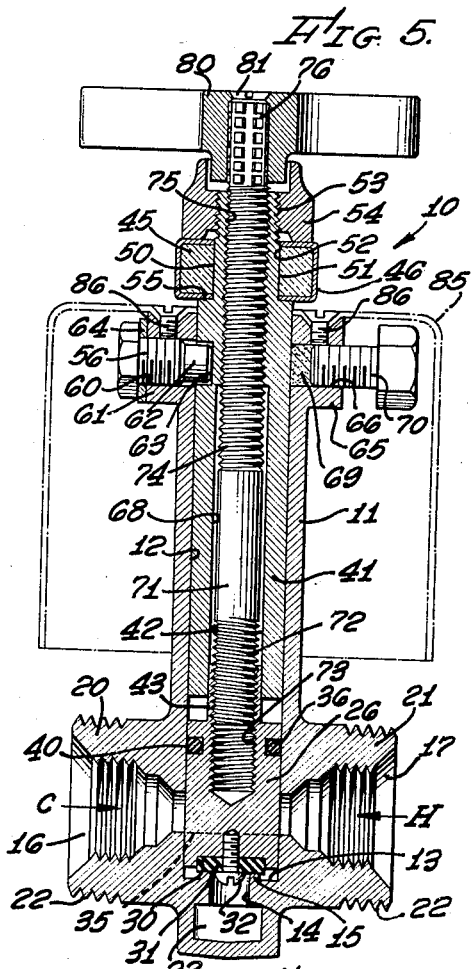
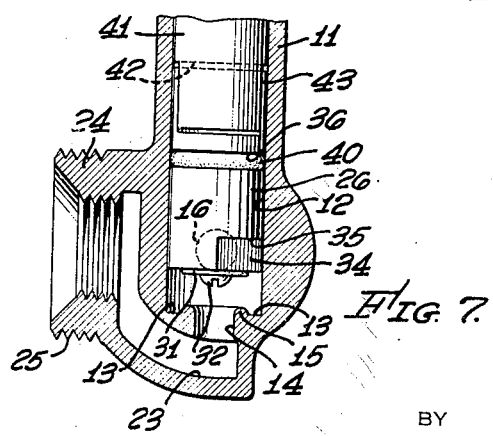
RICHARD C. BARKELEW,
INVENTOR.
BY
ATTORNEY Patented Mar. 28, 1950

2,501,657

UNITED STATES PATENT OFFICE 2,501,657

FLUID MIXTURE AND VOLUME CONTROL VALVE

Richard C. Barkelew, Sierra Madre, Calif.

Application February 28, 1948, Serial No. 12,003

13 Claims. (Cl. 277—12)

The present invention relates to fluid valves, and more particularly to mixing valves having means for regulating the relative proportions of fluids delivered through two inlet supply pipes, and for controlling the total volume of fluid discharged through an outlet pipe. Specifically the present invention is directed to a mixing valve embodying a valve member which is rotatable with respect to two angularly spaced inlet ports in the housing to control the mixture proportions, and which is movable axially with respect to both the inlet ports and the outlet port to control the volume of mixed fluids discharged through the latter.

One of the primary objects of the invention is to provide a new and improved mechanism for rotating the valve member in its chamber to control the mixture proportions, and for moving the same axially without rotation so as to control the discharge volume. In this connection, one of the advantages of the invention is that the valve operating mechanism is completely sealed off from the fluid passing through the valve, so that the screw threads can be packed with grease, thereby eliminating wear and giving an exceedingly smooth action. A further advantage which is realized as a consequence of being able to lubricate the threads is that the standard National screw thread may be used instead of the more expensive Acme thread. In conventional valves, the screw threads are exposed directly to the fluids being handled, and therefore cannot be lubricated satisfactorily; hence it is necessary to use the Acme thread because the large bearing area of the latter is required to minimize wear. With the present invention, however, the threads are permanently lubricated, and the National thread is entirely satisfactory for the purpose.

Another object of the invention is to provide a mixing valve, wherein the volume-controlling axial travel of the valve member is a straight-line movement, without any circular or rotational component. This object is attained by the use of a turnbuckle-like arrangement, and one of the principal advantages is that the valve washer is closed against its seat without rubbing or scouring the seat. With prior valves in which the valve member rotates as it closes, this problem of the scouring action of the washer on the seat is overcome by using freely rotatable ball bearing washers or the like, but such washers are expensive and a frequent source of trouble. In the present invention, the need for rotatable ball bearing washers is eliminated, hence the much simpler and far less expensive plain washer can be used with equally good results. Furthermore, the straight line travel of the valve member, combined with the accurate movement of the member within the valve chamber, makes it possible to substitute an O-ring seal in place of the conventional washer; said O-ring seal being adapted to enter the end of the axially disposed outlet port, and cooperating with the side walls thereof to close the port. Still another advantage of the turnbuckle arrangement is that the combined left and right hand threads give a large travel to the valve stem for a small angular movement, yet without requiring a steep pitch to the threads. This last-named feature eliminates the one other remaining advantage which has heretofore been enjoyed by the Acme thread.

Other objects of the invention are: to provide a mixture and volume control valve having two separate, coaxially arranged, rotatable control handles for regulating the mixture proportions and volume, respectively; to provide a mixing valve wherein the two inlet ports are closed off from one another when the valve is shut off, so that there is no possibility of by-pass from one inlet port to the other; to provide a valve which can readily be disassembled for service; and to provide a valve which can be installed in a manner to correct for reversed hot and cold water pipes without changing the nameplates.

The foregoing and other objects and advantages of the invention will become apparent to those skilled in the art upon consideration of the following detailed description of the preferred embodiments thereof, reference being had to the accompanying drawings, in which:

Figure 1 is an elevational view of a valve embodying the principles of the invention;

Figure 2 is a top plan view of the same;

Figure 3 is an enlarged sectional view, taken along the line 3—3 in Figure 1;

Figure 4 is an enlarged vertical section through the valve, taken along the line 4—4 in Figure 2, and showing the valve in the open condition;

Figure 5 is a view similar to Figure 4, showing the valve in the closed condition;

Figure 6 is a sectional view taken along the line 6—6 in Figure 4;

Figure 7 is a sectional view taken along the line 7—7 in Figure 4; and

Figure 8 is an enlarged fragmentary sectional view, showing an O-ring seal substituted for the conventional washer on the bottom end of the valve member.

Mixture and volume control valves of the type with which the present invention is concerned, are adapted for use in any situation requiring changes in the mixture proportions of two incoming fluids without appreciable variation of the total output volume, or changes in the volume without appreciable change in the mixture proportion. The principal use of such valves, however, is in shower installation wherein hot and cold water are mixed in proper proportions to give the desired temperature, and where it is desirable to be able to increase or decrease the total volume of water being discharged, or to turn the water off entirely without disturbing the mixture proportions. Accordingly, the embodiment selected to illustrate the principles of the invention is one designed primarily for shower installations, but it is to be understood that the invention is in no way limited solely to such use, and might be used to equal advantage in many industrial applications.

In the drawings, the valve is designated in its entirety by the reference numeral 10, and is seen to comprise a generally cylindrical body 11, preferably of brass, having a cylindrical chamber 12 formed therein. Inasmuch as the drawings show the valve in a vertical position, the following description will refer to the several parts thereof as the top, bottom, etc., although it will be understood that such orientation relates solely to the illustrative drawings. The top end of the chamber 12 is open, while the bottom end thereof is designated at 13, and is formed with a central, axially extending outlet port 14 having a raised annular seat 15 around its margin.

Intersecting the chamber 12 at a short distance above the bottom 13 are two diametrically opposed inlet ports 16 and 17 which open into oppositely extending coupling bosses 20 and 21, respectively. The bosses 20 and 21 are externally threaded at 22 to receive coupling members (not shown) which connect the cold water and hot water supply pipes to the valve. The outlet port 14 opens at its bottom end into a passageway 23 which curves upwardly and forwardly therefrom and opens into a forwardly extending coupling boss 24 that is threaded at 25 to receive a coupling member for connecting the valve to a discharge pipe.

Slidably disposed within the bottom portion of the chamber 12 and also rotatable therein, is a cylindrical valve member 26 which is preferably, although not necessarily, formed of stainless steel. A shallow circular recess 30 is machined in the bottom end of the member 26, and seated within this recess is a rubber washer 31 which is secured by a screw 32. The washer 31 is adapted to bear against the annular seat 15 when the member 26 is at the lower extremity of its travel, thereby shutting off the flow of water discharged through the outlet port 14.

Formed in the sides of the valve member 26 at the bottom end thereof are passage means which cooperate with the inlet ports 16, 17 to control the flow of fluid entering the chamber 12. These passage means are illustratively shown as comprising two angularly spaced flats 33 and 34 which are milled into the cylindrical surface of the valve member 26; although the invention is not in any way limited to flats, but also contemplates the use of curved surfaces or channels that are developed to give more accurate control. The flats 33, 34 are spaced slightly more than 90° apart so that when the member 26 is turned counterclockwise, or to the left (Figure 6) as far as it will go, inlet port 16 is completely uncovered by flat 33, while port 17 is completely closed off by the valve member. Similarly, when the valve member 26 is turned to the right as far as it will go, port 17 is completely uncovered by flat 34, while port 16 is completely closed off by valve member. When the valve member is positioned so that the flats 33, 34, uncover ports 16 and 17 equally, as shown in Figure 6, the volume of flow from each side is equal.

At the top edge of each of the flats 33, 34 is a shoulder 35 which is adapted to cut off the inlet ports 16, 17, when the valve member 26 is moved downwardly to the bottom of the chamber 12. The shoulders 35 close the ports 16, 17 just before the washer 31 closes against the seat 15, and the inlet ports are thus closed off from one another when the valve is closed, so that by-pass of water from one inlet to the other is positively prevented.

The upper portion of the cylindrical valve member 26 has an annular groove 36 formed therein, and seated within this groove is an O-ring 40 of rubber or like material, which seals the clearance between the valve member and the wall of the chamber 12 against leakage of water into the upper portion of the chamber.

Rotation of the valve member 26 within the chamber 12 to regulate the mixture proportions of the fluid flow is effected by means of a tubular member 41 which is rotatably disposed within the top portion of the chamber. The bottom end of the tube 41 has two diametrically opposed axially extending slots 42 formed therein which receive a companionate tongue 43 projecting upwardly from the top end of the valve member 26, and this tongue and slot connection between them causes the valve member to be rotated with the tube 41. At the same time, the valve member is permitted to move axially with respect to the tube 41 to the extent of the length of engagement of the tongues 43 within the slots 42.

The tube 41 projects above the top end of the valve body 11, and fixedly secured to the projecting end thereof is a mixture control handle 45. The handle 45 is preferably, although not necessarily, in the form of a transversely extending, elongated bar, which may be made of plastic or other suitable material, with a sheet metal sleeve 46 surrounding its midportion. Flats 50 and 51 are milled into opposite sides of the projecting end of the tube 41, and the handle bar 45 and sleeve 46 have correspondingly shaped holes 52 formed therein which receive the flat-sided portion of the tube, providing a non-rotatable connection between the handle and the tube. The top end portion of the tube projecting above the handle bar 45 is threaded at 53, and a nut 54 is screwed onto the threads to clamp the handle bar down tightly against shoulder 55 at the bottom edge of the flats 50, 51.

The tube 41 is held against axial movement within the chamber 12 and is also limited to an angular travel of slightly more than 90°, by means of a limit stop bolt 56 which is screwed into a threaded hole 60 formed in a boss 61 projecting laterally from one side of the valve body 11 at the top end thereof. The threads are relieved from the inner end of the bolt 56, forming a smooth-sided nose 62 which extends into a circumferentially extending slot 63 in the side of the tube 41. The length of the slot 63 is such that its ends are engaged by the nose 62 when the tube and valve members 26 are turned to either extreme position of the latter. A lock washer 64 prevents the bolt 56 from working loose.

On the opposite side of the valve body 11 from boss 61 is another laterally projecting boss 65 having a threaded hole 66 provided therein which receives a screw 70. The inner end of the screw 70 bears against a plug of fibrous material 69, pressing the same against the surface of the tube 41. The plug of material 69 functions as a friction brake for the tube 41 and restrains the latter against turning when the volume control handle is turned. The degree of frictional restraint can be increased or decreased by tightening or loosening the screw 70.

Axial movement of the valve member 26 to regulate the volume of flow is obtained by means of a turnbuckle-like arrangement consisting of a stem 71 which extends down through the central opening 68 of the tubular member 41. The bottom end of the stem 71 has a left hand thread 72 formed thereon, and this threaded portion is received within a threaded hole 73 in the valve member 26. The upper portion of the stem 71 has a right hand thread 74 formed thereon, which is engaged by internal threads 75 formed in the upper end of the hole 68.

The stem 71 projects beyond the top end of the tube 41, and its upper end is serrated, or splined at 76 to receive a volume control handle 80. The volume control handle 80 is coaxial with the mixture control handle 45 and is spaced outwardly therefrom. A screw 81 which is threaded into a tapped hole in the top end of the stem 71 holds the handle 80 on the stem.

In the usual installation, the bottom portion of the valve body 11 is located within the bathroom wall, with the top portion projecting through a hole in the wall. Both the valve body 11 and the hole in the wall are preferably concealed by an ornamental, cup-shaped bonnet 85 which is secured to the valve body by a pair of countersink screws 86 threaded into tapped holes in the top surface of the bosses 61 and 65.

The operation of my valve is believed to be self-evident from the foregoing description. The mixture proportions of the incoming hot and cold water (designated by the arrows H and C) is regulated by turning the mixture control handle 45 to one side or the other from the straight up and down position shown in solid lines in Figure 2. When the handle is turned to the left as far as it will go, the cold water port 16 is completely uncovered by the flat 33, while the hot water port 17 is entirely closed off. When the handle 45 is turned to the right as far as it will go, the hot water port 17 is uncovered by the flat 34, and the cold water port 16 is closed off. In the intermediate position, the two ports are equally exposed, and one-half the total volume of water passing through the valve enters through the cold water port 16, while the other half enters through the hot water port 17. With the mixture control handle 45 positioned at any desired setting, the volume of flow is regulated by turning the volume control handle 80. When the handle 80 is turned to the right, or clockwise, the right hand threads 74 cause the stem 71 to move downwardly with respect to the tubular member 41, while the left hand threads 72 cause the valve member 26 to move downwardly with respect to the stem 71. Thus, the travel of the valve member 26 is equal to the sum of the movements imparted to it by the right hand threads 74 and the left hand threads 72. The advantage of this arrangement is that the valve member 26 is advanced twice as fast as it would be if there were only one set of threads of the same pitch. Since the upper part of the valve chamber 12 is sealed off from the bottom portion thereof by the O-ring seal 40, the threads 72 and 74 can be packed with grease for permanent lubrication.

One of the features of the invention is that it permits the optional substitution of an O-ring seal arrangement, such as that shown in Figure 8, for the flat rubber washer 31 shown in Figures 1–7, inclusive. The advantage of the O-ring over the conventional flat washer is that the former seals with effortless ease, whereas the flat washer must be clamped tightly against its seat. Furthermore, if the washer is not closed absolutely water-tight, the leakage of water over the metallic seat causes erosion of the latter, which can be corrected only by grinding or refacing the seat. The O-ring forms a positive, absolutely leak-proof seal, and is therefore not subject to erosion. The present invention is particularly adapted to the use of O-ring seals, because of the fact that the valve member 26 moves in a straight-line path, without any rotation, and because the valve member is accurately guided within the chamber 12.

In Figure 8, the washer 31 has been removed and a smaller washer 90 substituted therefor. Surrounding the threads of the screw 32 between the head of the latter and the washer 90 is a thin-walled spacer sleeve 91, and disposed within the annular space between the screw head and the washer is an O-ring 92. The O-ring 92 is very slightly larger in outside diameter than the diameter of the outlet port 14, and is therefore squeezed slightly when pushed down into the same, forming a water-tight seal. Being interchangeable with the flat washer 31, the O-ring arrangement of Figure 8 can be installed initially at the factory, and then replaced by a flat washer 31 if subsequent repairs are necessary and replacement O-rings are not available.

Another important advantage of the invention is that the construction of the valve permits installation to correct for reversed hot and cold inlet pipes without changing the nameplates. This may be accomplished in either of two ways; by turning the valve member 26 through 180° so that the flat 33 cooperates with the inlet port 17 and flat 34 cooperates with port 16; or by turning the entire assembly 180°. In this latter case, the tubular member 41, stem 71, and valve member 26 would be turned to the new position. If the entire assembly is reversed, it becomes necessary to move the screw 70 and friction plug 69 from the hole 66 to the opposite hole 60, and to move the limit stop bolt 56 around to the other side. To this end, the two holes are made of the same diameter and thread pitch, so that the screws can be interchanged.

Still a further advantage of the invention is that the two inlet ports 16 and 17 are both cut off by the shoulder 35 when the valve member 26 is closed on the outlet seat 15. In this way, by-pass of water from one inlet port to the other is positively prevented when the valve is closed.

While I have shown and described in considerable detail what I believe to be the preferred form of my invention, it is to be understood that such details are merely illustrative, and that various changes may be made in the shape and arrangement of the several parts thereof without departing from the scope of the invention, as defined in the appended claims.

I claim:
1. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a mixture control handle connected to said valve member to rotate the same, and a separate volume control handle arranged coaxial with said mixture control handle and connected with said valve member to move the latter axially when the handle is turned.

2. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a mixture control handle connected to said valve member to rotate the same, a separate volume control handle, and a screw thread connection between said volume control handle and said valve member whereby the latter is moved axially when the handle is turned.

3. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a mixture control handle connected to said valve member to rotate the same, a separate volume control handle, screw thread means within said chamber connecting said volume control handle with said valve member whereby the latter is moved axially when the handle is turned, and seal means disposed between said inlet ports and said screw thread means for sealing the clearance between said valve member and the chamber wall against leakage of fluid into said screw thread means.

4. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a mixture control handle connected to said valve member to rotate the same, a volume control handle, screw thread means within said chamber connecting said volume control handle with said valve member whereby the latter is moved axially when the handle is turned, said valve member having an annular groove formed therein between said inlet ports and said screw thread means, and an O-ring seal disposed within said groove for sealing the clearance between said valve member and the chamber wall against leakage of fluid into said screw thread means.

5. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber and having a connection with said valve member whereby the latter is movable axially with respect to the tubular member but is non-rotatable relative thereto, means restraining said tubular member against axial movement within said chamber, a mixture control handle connected to said tubular member, a stem extending down through said tubular member and having a threaded connection with said valve member, whereby the valve member is moved axially when said stem is rotated, and a volume control handle connected to said stem.

6. A fluid valve comprising a body having a cylindrical chamber formed therein, a pair of angularly spaced inlet ports opening through the side walls of said chamber adjacent the bottom end thereof, an outlet port opening into said chamber through the bottom end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber above said valve member and projecting from the top end of said body, said tubular member being connected with said valve member in a manner whereby the latter is movable axially with respect to the tubular member but is non-rotatable relative thereto, means restraining said tubular member against axial movement within said chamber, a mixture control handle fixed to the projecting end of said tubular member, a stem extending down through said tubular member and having a threaded connection with said valve member, whereby the latter is moved axially when said stem is rotated, and a volume control handle connected to said stem.

7. A fluid valve comprising a body having a cylindrical chamber formed therein, a pair of angularly spaced inlet ports opening through the side walls of said chamber adjacent the bottom end thereof, an outlet port opening into said chamber through the bottom end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber above said valve member and projecting from the top end of said body, said tubular member being connected with said valve member in a manner whereby the latter is movable axially with respect to the tubular member but is non-rotatable relative thereto, means restraining said tubular member against axial movement within said chamber, a mixture control handle fixed to the projecting end of said tubular member, a stem extending down through said tubular member and movable axially with respect thereto, said stem being connected with said valve member, whereby the latter can be moved axially to control the volume of flow, and a volume control handle connected to said stem.

8. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber and having a tongue and slot connection with said valve member whereby the latter is movable axially with respect to said tubular member but is non-rotatable relative thereto, said tubular member being restrained against axial movement within said chamber, a mixture control handle connected to said tubular member, a stem rotatably disposed within said tubular member and having a connection with said valve member whereby the latter is moved axially when said stem is rotated, and a volume control handle connected to said stem.

9. A fluid valve comprising a body having a cylindrical chamber formed therein, a pair of angularly spaced inlet ports opening through the side walls of said chamber adjacent the bottom end thereof, an outlet port opening into said chamber through the bottom end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber above said valve member and projecting from the top end of said body, said tubular member being connected with said valve member in a manner whereby the latter is movable axially with respect to the tubular member but is non-rotatable relative thereto, means restraining said tubular member against axial movement within said chamber, a mixture control handle fixed to the projecting end of said tubular member, a stem extending down through said tubular member and having a threaded connection therewith, whereby said stem is moved axially when turned, said stem being connected to said valve member, and a volume control handle connected to said stem.

10. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber and having a tongue and slot connection with said valve member whereby the latter is movable axially with respect to said tubular member but is nonrotatable relative thereto, said tubular member being restrained against axial movement within said chamber, a mixture control handle connected to said tubular member, a stem extending down through said tubular member and having a connection therewith whereby the stem is moved axially when rotated, said stem being also connected to said valve member in a manner whereby rotation of the stem causes the valve member to move axially with respect thereto, and a volume control handle connected to said stem.

11. A fluid valve comprising a body having a cylindrical chamber formed therein, a pair of angularly spaced inlet ports opening into said chamber through the side walls thereof, an outlet port opening into said chamber through one end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber and having a tongue and slot connection with said valve member whereby the latter is movable axially with respect to said tubular member but is non-rotatable relative thereto, said tubular member being restrained against axial movement within said chamber, a mixture control handle connected to said tubular member, a stem rotatably disposed within said tubular member and having a threaded connection therewith, whereby said stem is moved axially when turned, said stem being connected to said valve member by a thread of opposite direction to said first-named thread, whereby rotation of said stem causes said valve member to move in the same direction with respect to the stem as said stem moves with respect to said tubular member, and a volume control handle connected to said stem.

12. A fluid valve comprising a body having a cylindrical chamber formed therein, a pair of angularly spaced inlet ports opening through the side walls of said chamber adjacent the bottom end thereof, an outlet port opening into said chamber through the bottom end thereof, a cylindrical valve member disposed within said chamber, said valve member being rotatable and slidable axially within said chamber and having passage means formed in the side walls thereof adapted to cooperate with said inlet ports to regulate the volume of fluid admitted through each one thereof, said valve member being adapted to cooperate with said outlet port to regulate the volume of fluid discharged therethrough, a tubular member rotatably disposed within said chamber above said valve member and projecting from the top end of said body, said tubular member being connected with said valve member in a manner whereby the latter is movable axially with respect to the tubular member but is non-rotatable relative thereto, means restraining said tubular member against axial movement within said chamber, a mixture control handle fixed to the projecting end of said tubular member, a stem extending down through said tubular member and having a right hand thread connection therewith, whereby said stem is advanced toward said bottom end of said chamber when turned in a clockwise direction, said stem having a left hand thread connection with said valve member, whereby the latter is advanced toward said bottom end of said chamber with respect to said stem when the latter is turned, and a volume control handle fixed to said stem coaxial with said mixture control handle and spaced outwardly therefrom.

13. A mixture and volume control shower valve comprising a body having a cylindrical chamber formed therein, a pair of diametrically opposed hot and cold water inlet ports opening through the side walls of said chamber adjacent the bottom end thereof, an outlet port opening into said chamber through the bottom end thereof, a cylindrical valve member disposed within said chamber, said valve member being rotatable and slidable axially within said chamber and having passage means formed in the side walls thereof adapted to cooperate with said inlet ports to regulate the volume of flow admitted through each one thereof, said valve member being adapted to cooperate with said outlet port to regulate the volume of flow discharged therethrough, a tubular member rotatably disposed within said chamber above said valve member, cooperating tongue and slot formations on the adjacent ends of said tubular member and said valve member, whereby the valve member is slidable axially but is non-rotatable with respect to the tubular member, said valve member being adapted to be turned 180° with respect to said tubular member to correct for reversed hot and cold water supply pipes, a mixture control handle connected to said tubular member, a stem extending down through said tubular member and having a detachable connection with said valve member, said stem being operative to move said valve member axially when turned, and a volume control handle fixed to said stem.

RICHARD C. BARKELEW.

REFERENCES CITED

The following references are of record in the file of this patent:

UNITED STATES PATENTS

| Number | Name | Date |
| --- | --- | --- |
| 1,882,953 | Saelzler | Oct. 18, 1932 |
| 1,943,865 | Hennessey | Jan. 16, 1934 |
| 2,373,702 | Moen | Apr. 17, 1945 |